United States Patent

Miyamoto et al.

[11] Patent Number: 6,101,569
[45] Date of Patent: Aug. 8, 2000

[54] COMPUTER RESOURCES ACCESS CONTROL APPARATUS AND METHOD

[75] Inventors: Kohtaroh Miyamoto, Tokyo-to; Kenichi Okuyama, Kanagawa-ken, both of Japan

[73] Assignee: International Business Machines Corporation, Armonk, N.Y.

[21] Appl. No.: 09/111,029

[22] Filed: Jul. 7, 1998

[30] Foreign Application Priority Data

Jul. 7, 1997 [JP] Japan ................................. 9-181024

[51] Int. Cl.$^7$ .................................................. G06F 12/00
[52] U.S. Cl. ......................................... 710/200; 707/8
[58] Field of Search ............................. 710/200; 707/8; 711/151–153; 709/102–108

[56] References Cited

U.S. PATENT DOCUMENTS

| | | | |
|---|---|---|---|
| 5,285,528 | 2/1994 | Hart | 710/200 |
| 5,603,018 | 2/1997 | Terada et al. | 712/220 |
| 5,761,659 | 6/1998 | Bertoni | 707/8 |
| 5,933,824 | 8/1999 | DeKoning et al. | 707/8 |
| 5,956,712 | 9/1999 | Bennett et al. | 707/8 |

Primary Examiner—Glenn A. Auve
Assistant Examiner—Sumati Lefkowitz
Attorney, Agent, or Firm—Scully, Scott, Murphy & Presser; Jay P. Sbrollini, Esq.

[57] ABSTRACT

The present invention is directed to obtaining a correct processing result without an inexpedience such as a starvation by having a plurality of processes gain an access in parallel to a resource such as a VRAM. When one of a plurality of processing means requests an exclusive access to a portion of a resource, a lock range processing part 122 permits an exclusive access only when the process does not result in an inexpedience, for example, when other processing means is not permitted to gain an exclusive access to an overlapped portion. Further, the lock range processing part 122 inhibits permission of an exclusive access to other portion overlapping a portion and permits an exclusive access to such portion when the number of permissions of exclusive accesses to other portion overlapping this portion exceeds a given number while an exclusive access to such portion is not permitted. The lock range processing part 122 thus prevents a starvation from occurring by limiting the number of permissions of an exclusive access to other overlapping portion passing a portion which overlaps the other overlapping portion.

7 Claims, 6 Drawing Sheets

Content of Lock Range Processing

Figure 3

| RID | Use | PU ID | Lock | range (x1,y1)-(x2,y2) | count |
|-----|-----|-------|------|------------------------|-------|
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |
|     |     |       |      |                        |       |

126

Content of Lock Range Processing

Content of Unlock Processing (A) Error (B) Correct

COMPUTER RESOURCES ACCESS CONTROL APPARATUS AND METHOD

BACKGROUND OF THE INVENTION

1. Technical Field

The present invention relates to a computer resources access control apparatus and method for controlling access by each process/thread to a shared resource in a system in which a plurality of processes or threads gain an access to a shared computer resource for processing.

More specifically, the present invention relates to a computer resources access control apparatus and method for controlling write access by each processing element to a VRAM so that a regular processing result is finally obtained in an image processing system in which each of a plurality of image processing processor elements (PE) writes image data having an overlapped areas to a shared computer resource (video RAM, i.e., VRAM).

2. Prior Art

When, for example, a plurality of processes or threads process in parallel using a shared data resource (shared resource), an inexpedience or a contradiction in processing could be invited wherein, for example, data written by a process/thread in a portion of a shared resource is destructed by another process/thread writing data to the same portion.

Thus, in a parallel processing system in which a plurality of process/threads gain an access to a shared resources and process in parallel, a restricting control is needed to allow only one of the plurality of process/threads to gain an access to one portion of the shared resource while inhibiting any other process/threads from gaining an access to this portion simultaneously. A computer system which effects a control to limit a portion to which a plurality of process/threads can gain an access simultaneously is called a synchronous computer system.

A method of access control among a plurality of process/threads in the above described synchronous computer system includes a mutual exclusion (hereinafter called MUTEX) method which simply controls access by a plurality of process/threads to a shared resource on an exclusive base, and a semaphore method based in a more complex control, for example. In the synchronous computer system, these methods are implemented so as not to invite an inexpedience inherent to the synchronous computer system among process/threads such as a deadlock or starvation. The above starvation is a phenomenon in which, in an attempt by a process/thread to gain an access to one of a plurality of portions on a memory, an inaccessible time period sustains for a long time because an exclusive control is applied to another overlapped portion. Assuming a portion C partly overlapping a portion A and a portion B (portions A and B do not overlap) as a specific example, states (a) , . . . (f) shown in Table 1 below may continue to loop resulting in a starvation so that a process/thread can never gain an access to the portion C.

Table 1—Specific Example of Starvation (a) The portion C may not be locked while the portion A stays locked.

(b) If lock is requested to the portion B, the portion B may be locked because it does not overlap the portion A.

(c) Even if the portion A is unlocked, the portion C overlapping the portion B which was locked in (b) can not be locked.

(d) The portion C may not be locked while the portion B stays locked (e) If lock is requested to the portion A, it may be locked because it does not overlap the portion B.

(f) Even if the portion B is unlocked, the portion C overlapping the portion A which was locked in (e) may not be locked.

In the above, "lock" means a state in which an access to a portion x by one of processing means operating in parallel is permitted while an access to the portion x by other processing means is inhibited and "unlock" means a state in which a locked state is released from locking.

In the area of image processing, a process of generating a final image from data is called "rasterize". Conventionally, a prior art rasterizing device used to have only one image processing means per unit so that a rasterizing process was performed in the sequence specified by input data without parallel processing performed. Accordingly, the rasterizing process was always performed in the sequence specified by data so that there was no chance where the finally obtained image contained an error due to disordered sequence of processing.

However, a device which processes rasterizing by using a plurality of image processing means has been advent in recent years in which the sequence of processing data could be disordered among the image processing means resulting in an error in the finally obtained image. For example, when it is necessary to draw a rectangular image overlapped on a circular image, a correct image can be obtained by drawing the rectangular image after the circular image has been drawn while a correct image can not be obtained if the circular image is drawn after the rectangular image has been drawn. In other words, a plurality of processing threads must not simultaneously write to an overlapped areas of a portion of a shared resource.

Further, there is a rasterize processing method such as HTML (HyperText Markup Language) in which stored data is taken out part by part as needed for rasterize processing rather than controlling the entire data as a single data stream. In using such method, it is necessary to process the data satisfying a requirement first to shorten the time of rasterize processing rather than processing the data in the specified sequence.

In rasterize processing using a plurality of process/threads, it is the simplest way to have each process/thread rasterize different portions in parallel. However, when each process/thread is going to rasterize in parallel in the above described synchronous computer system, necessary processing performance may not be available or a memory of huge capacity may be needed.

Such inexpediency is further described with reference to a specific example.

When a method of locking the entire VRAM for image preparation by a single MUTEX is employed in rasterize processing using a plurality of process/threads, only a single process/thread can process rasterizing at one time. The parallelism of rasterize processing is thus harmed and a high processing performance can not be obtained.

Also, when a method of locking pixel by pixel using MUTEX in rasterize processing using a plurality of process/threads, a number of MUTEX processing corresponding to the number of pixels constituting an image are required. Thus, a huge capacity of a memory is needed and, in addition, a long time is required for locking and unlocking processes by MUTEX so that a high processing performance can not be obtained.

When a method of exclusively controlling each portion to be rasterized using semaphore (a synchronous computer system stores locked portions and, upon occurrence of a new request to lock a predetermined portion, permits to lock only a portion which does not overlap another portion which is already locked) is employed in rasterize processing using a plurality of process/threads, the above described starvation may occur so that a high performance may not be obtained.

The present invention was conceived in view of the above described problems in the prior art and has a purpose of providing a computer resource access control apparatus and method which assure a correct processing result to be obtained without causing a starvation when a plurality of processing threads gain an access to a shared computer resource such as a VRAM for rasterize processing in a synchronous computer system and further assures a high processing performance using a memory of reasonable capacity.

SUMMARY OF THE INVENTION

The present invention is directed to a computer resource access control apparatus which, when one of a plurality of processing means requests an access to a plurality of portions comprising divisions of the computer resource which are divided such that at least a part of areas may overlap each other while inhibiting an access by other processing means (exclusive access), permits or inhibits said exclusive access to said portions, comprising;

exclusive access permission control means, operative when said processing means requests an exclusive access to said portion while an exclusive access to other one or more of said portions having an area overlapping said portion to which said processing means requested an exclusive access is not permitted, for permitting said processing means requesting the exclusive access to gain an exclusive access to said portion, a plurality of counting means provided in correspondence to each of said portions for counting the number of said exclusive accesses permitted to said other one or more portions having an area overlapping the corresponding one of said portions for each period in which said exclusive access to corresponding one of said portions is requested while said exclusive access to the corresponding one of said portions is not permitted, and access inhibiting control means for inhibiting permission of an exclusive access to said other one or more portions having an area overlapping said portion corresponding to said counting means when the count of said counting means reaches a predetermined value.

The present invention is further directed to a computer resource access control method in which, when one of a plurality of processing means requests an access to a plurality of portions comprising divisions of the computer resource which are divided such that at least a part of areas may overlap each other while inhibiting another processing means from gaining an access (exclusive access), permits or inhibits each of said processing means to gain said exclusive access to said portions, comprising;

permitting said processing means requesting the exclusive access to gain an exclusive access to said portion when said processing means requests an exclusive access to said portion while an exclusive access to other one or more of said portions having an area overlapping said portion to which said processing means requested an exclusive access in not permitted, counting the number of said exclusive accesses permitted to said other one or more portions having an area overlapping corresponding one of said portions for each period in which said exclusive access to corresponding one of said portions is requested and said exclusive access to the corresponding one of said portions is not permitted and, inhibiting permission of an exclusive access to said other one or more portions having an area overlapping said portion in which said count reaches a predetermined value.

Still further, the present invention is directed to a computer readable recording medium recording therein a program which, when one of a plurality of processing means requests an access to a plurality of portions comprising divisions of the computer resource which are divided such that at least a part of areas may overlap each other while inhibiting another processing means from gaining an access (exclusive access), permits or inhibits each of said processing means to gain said exclusive access to said portions, and causes a computer to execute the steps of;

permitting said processing means requesting the exclusive access to gain an exclusive access to said portion when said processing means requests an exclusive access to said portion while an exclusive access to other one or more of said portions having an area overlapping said portion to which said processing means requested an exclusive access is not permitted, counting the number of said exclusive accesses permitted to said other one or more portions having an area overlapping corresponding one of said portions for each period in which said exclusive access to corresponding one of said portions is requested and said exclusive access to the corresponding one of said portions is not permitted, and inhibiting permission of an exclusive access to said other one or more portions having an area overlapping said portion in which said count reaches a predetermined value.

BRIEF DESCRIPTION OF THE DRAWINGS

Preferred embodiments of the present invention will now be described, by way of example only, with reference to the accompanying drawings in which:

FIG. 3 is a chart showing the content of the range table which the range table control part shown in FIG. 2 controls.

DETAILED DESCRIPTION OF THE PREFERRED EMBODIMENTS OF THE INVENTION

Figure 1:
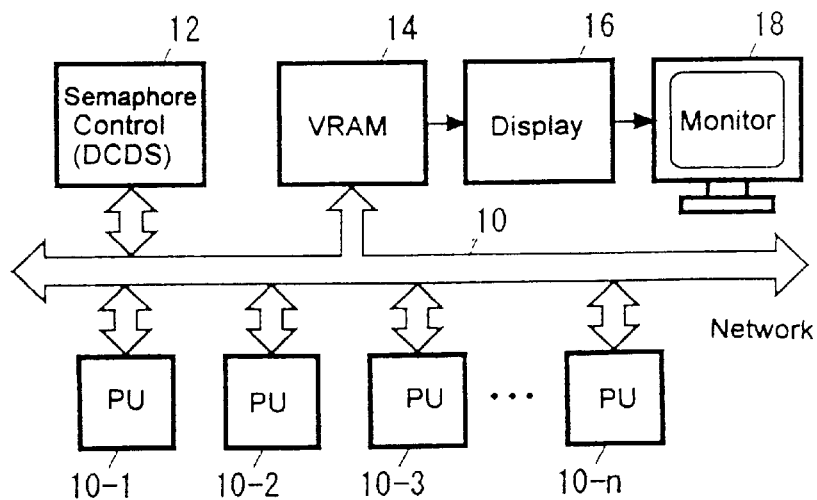
FIG. 1 is a diagram showing a configuration of a multi-processor computer to which the computer resource access control method of the present invention is applied.

In one aspect, the present invention relates to a computer resource access control apparatus which, when one of a plurality of processing means requests an access to a plurality of portions comprising divisions of the computer resource which are divided such that at least a part of areas may overlap each other while inhibiting an access by another processing means (exclusive access), permits or inhibits said exclusive access to said portions, comprising; exclusive access permission control means, operative when said processing means requests an exclusive access to said portion while an exclusive access to other one or more of said portions having an area overlapping said portion to which said processing means requested an exclusive access is not permitted, for permitting said processing means requesting the exclusive access to gain an exclusive access to said portion, a plurality of counting means provided in correspondence to each of said portions for counting the number of said exclusive accesses permitted to said other one or more portions having an area overlapping the corresponding one of said portions for each period in which said exclusive access to corresponding one of said portions is requested while said exclusive access to the corresponding one of said portions is not permitted, and access inhibiting control means for inhibiting permission of an exclusive access to said other one or more portions having an area overlapping said portion corresponding to said counting means when the count of said counting means reaches a predetermined value.

The computer resource access control device of the present invention realizes a synchronous computer system by permitting or inhibiting each of the processing means to gain an exclusive access to each portion of the computer resource when one of a plurality of processing means (process/thread) operating in parallel requests an exclusive access to a portion of the computer resource such as a VRAM, all or a part of which may overlap each other.

The exclusive access permission control means performs a synchronous control (exclusive control) by MUTEX or semaphore, for example, and, only when one of a plurality of processing means requests an exclusive access to a portion of the computer resource while an exclusive access to another portion having an area overlapping the portion to which said exclusive access was requested is not permitted and only when the portion to which an exclusive access was requested does not have an area overlapping another portion, permits the processing means requesting the exclusive access to exclusively gain an access to the desired portion of the computer resource. Conversely, when an exclusive access is permitted to another portion having an area overlapping the area to which the exclusive access was requested, the exclusive access permission control means does not permit the processing means which requested the exclusive access to gain an exclusive access.

The counting means provided correspondingly to the portions of the computer resource counts the number of permissions of exclusive access to another portion overlapping the corresponding portion (pass through number) when an exclusive access to the corresponding portion is not permitted by the control of the above described exclusive access permission control means despite an exclusive access to the corresponding portion is requested by one of processing means. As a specific example, when there is no overlap between a portion A and a portion B while there is an overlap partly between a portion C and the portion A and between the portion C and the portion B (refer to the Table 1), the counting means counts the number of permissions of exclusive access to the portions A and B while the exclusive access permission control means does not permit an exclusive access to the portion C based on the reason that an exclusive access is permitted to the portions A and B and clears the count when an exclusive access to the portion C is permitted. Incidentally, the method of counting in the counting means may include subtracting 1 from a predetermined value m every time an exclusive access to the portions A, B is permitted or adding 1 to the count every time an exclusive access to the portions A,B is permitted.

An access inhibit control means inhibits the exclusive access permission control means from permitting an exclusive access to another portion having an area overlapping the corresponding portion when the count of the counting means reaches a predetermined value. When the access inhibit control means inhibit permission of an exclusive access to a portion having an overlapped area in this manner, the exclusive access permission control means will immediately go to a process to permit an exclusive access to the corresponding portion at the point of time when the exclusive access to another portion having an overlapped area is completed. For a specific example, when there is no overlap between the portions A and B while there is an overlap in part between the portions A and C and between the portions B and C (refer to Table 1), the exclusive access inhibit control means inhibits the exclusive access permission control means from permitting an exclusive access to the portions A, B when the count of the counting means corresponding to the portion C reaches m. The exclusive access permission control means permits an exclusive access to the portion C immediately when the exclusive access to the portions A, B is completed to resolve the starvation occurring in the portion C.

In another aspect of the computer resource access control apparatus of the present invention, said plurality of processing means gain an exclusive accesses to said portion when an exclusive access is permitted while they wait a permission of exclusive access to said portion when the exclusive access is inhibited.

In a further aspect of the computer resource access control apparatus of this invention, said access permission control means comprises permission list preparing means for preparing a permission list which indicates said portions to which an exclusive access has been permitted, waiting list preparing means for preparing a waiting list indicating said portions to which said processing means wait to gain an exclusive access, and exclusive access permission means for permitting an exclusive access to the portion(s) other than said portion(s) indicted by said permission list, said portion(s) having an area overlapping said portion(s) indicated by said permission list, and said portion(s) indicated by said waiting list among said portions to which an exclusive access is requested.

In a further aspect of the computer resource access control apparatus of this invention, said plurality of processing means notify completion of an exclusive access when the exclusive access to said portion(s) is completed while said permission list preparing means adds to said permission list said portion(s) to which the exclusive access was permitted and removes said portion(s) which was notified of completion of exclusive access from said permission list.

In a further aspect of the computer resource access control apparatus of this invention, said waiting list preparing means adds to said waiting list said portion(s) indicated by said permission list, said portion(s) having an area overlapping said portion(s) indicated by said permission list, and said portion(s) to which an exclusive access was inhibited among said portions to which an exclusive access was requested while removing from said waiting list said portion(s) corresponding to said counting means the count of which reaches said predetermined value. one aspect of this invention relates to a computer resource access control method in which, when one of a plurality of processing means requests an access to a plurality of portions comprising divisions of the computer resource which are divided such that at least a part of areas may overlap each other while inhibiting another processing means from gaining an access (exclusive access), permits or inhibits each of said processing means to gain said exclusive access to said portions, comprising; permitting said processing means requesting the exclusive access to gain an exclusive access to said portion when said processing means requests an exclusive access to said portion while an exclusive access to other one or more of said portions having an area overlapping said portion to which said processing means requested an exclusive access is not permitted, counting the number of said exclusive accesses permitted to said other one or more portions having an area overlapping corresponding one of said portions for each period in which said exclusive access to corresponding one of said portions is requested and said exclusive access to the corresponding one of said portions is not permitted, and inhibiting permission of an exclusive access to said other one or more portions having an area overlapping said portion in which said count reaches a predetermined value. A computer readable recording medium of this invention records therein a program which, when one of a plurality of processing means requests an access to a plurality of portions comprising divisions of the computer resource which are divided such that at least a part of areas may overlap each other while inhibiting another processing means from gaining an access (exclusive access), permits or inhibits each of said processing means to gain said exclusive access to said portions, and causes a computer to execute the steps of; permitting said processing means requesting the exclusive access to gain an exclusive access to said portion when said processing means requests an exclusive access to said portion while an exclusive access to other one or more of said portions having an area overlapping said portion to which said processing means requested an exclusive access is not permitted, counting the number of said exclusive accesses permitted to said other one or more portions having an area overlapping corresponding one of said portions for each period in which said exclusive access to corresponding one of said portions is requested and said exclusive access to the corresponding one of said portions is not permitted, and inhibiting permission of an exclusive access to said other one or more portions having an area overlapping said portion in which said count reaches a predetermined value.

In one embodiment of the present invention, the computer resource access control method comprises adding a pass through counter to each synchronous control (exclusive control) means of semaphore or MUTEX, etc., which is provided for each of a plurality of portions which are divided from a computer resource such as a memory space of a VRAM with a part of areas being allowed to overlap each other, counting, while an exclusive access is not permitted to one portion by a reason that an exclusive access has been already permitted to another portion having an overlapped area, the number of permissions of exclusive access (pass through number) to another portion and limiting the pass through number to a value no greater than a given value for suppressing occurrence of a starvation.

FIG. 1 is a diagram showing the configuration of a multi-processor computer 1 to which the computer resource access control method of this invention is applied. While the components of the multi-processor computer 1 are shown as being a hardware in FIG. 1, they may be a software as far as that is feasible. Further, while FIG. 1 shows an example where the multi-processor computer 1 has only 1 of VRAM 14, . . . , monitor 18, a number of semaphore control parts 12 corresponding to the number of the VRAM 14, . . . , the monitor 18 need be provided when the multi-processor computer 1 has a plurality of VRAM 14, . . . , monitor 18.

As shown in FIG. 1, the multi-processor computer 1 comprises n processor units 10-1, . . . , 10-n (they will be simply denoted as a processor unit 10 unless a specific processor unit is to be meant), a semaphore control part (DCDS: 2 dimension range limited count down semaphore) 12, a VRAM 14, a display part 16 and a monitor 18, all interconnected via a network 20.

The multi-processor computer 1 operates as a synchronous computer system with these components in which a plurality of processor units 10-1, . . . , 10-n generate image data in parallel and rasterize it into an image by using a shared resource (VRAM 14) for display on the monitor.

Each component of the multi-processor computer 1 will now be described hereunder.

The processor units 10 each comprise, for example, a digital signal processor (DSP), an image frame memory and peripheral devices therefor. The processor unit 10 executes a process/thread for generating k dimensional (the case of k=2 is shown as an example) image data having an identifier (PU ID) unique within the multi-processor computer 1 and writes the image data into each portion of the 2 dimensional memory space of the VRAM 14 to which an exclusive access is permitted according to the exclusive access control of the semaphore control part 12 for rasterizing processing.

Incidentally, when the processor unit 10 attempts to gain an exclusive access to a portion x of the VRAM 14, it requests the semaphore control part 12 to lock the portion x by outputting as request data a lock request [lock range request (LRR); Request 1] which contains at least an identifier of the portion x (RID) (portion x is used to denote any one of a plurality of portions of the VRAM 14 without denoting a specific portion), range data of the portion x and an identifier of the processor unit 10 (PU ID) and gains an exclusive access according to response data (Response 1) returned in response to the Request 1.

In other words, the processor unit 10 gains an exclusive access to the portion x when a lock completion response [a locked reply (LR) containing the identifier of that processor unit 10 (PU ID) is returned form the semaphore control part 12, holds an exclusive access to the portion x until a locked reply is returned when a lock incomplete response [a not yet locked reply (NLR)] containing the identifier of that processor unit 10 (PU ID) is returned as a response data, and issues a Request 1 again to the semaphore control part 12 after a predetermined time (preferably a random length of time) has elapsed when a lock unable response [a full reply (FR)] containing the identifier of that processor unit 10 (PU ID) is returned as response data.

Further, the processor unit 10 issues as request data a lock release request [unlock request (ULR); Request 2] containing the identifier of the processor unit 10 (PU ID) and the identifier of the portion x (RID) when, for example, the rasterizing process has been completed and an exclusive access to the portion x is no longer necessary and requests the semaphore control part 12 to unlock the portion x for ending the process of rasterizing, etc.

The VRAM 14 has a 2 dimensional memory space which can be divided into a plurality of portions with at least a part of areas overlapping each other and outputs image data which is written by each processor unit 10 by a rasterize process to the display part 16 as one image.

The display part 16 converts an image inputted from the VRAM 14 to an image signal for displaying on the monitor 18.

Figure 2:
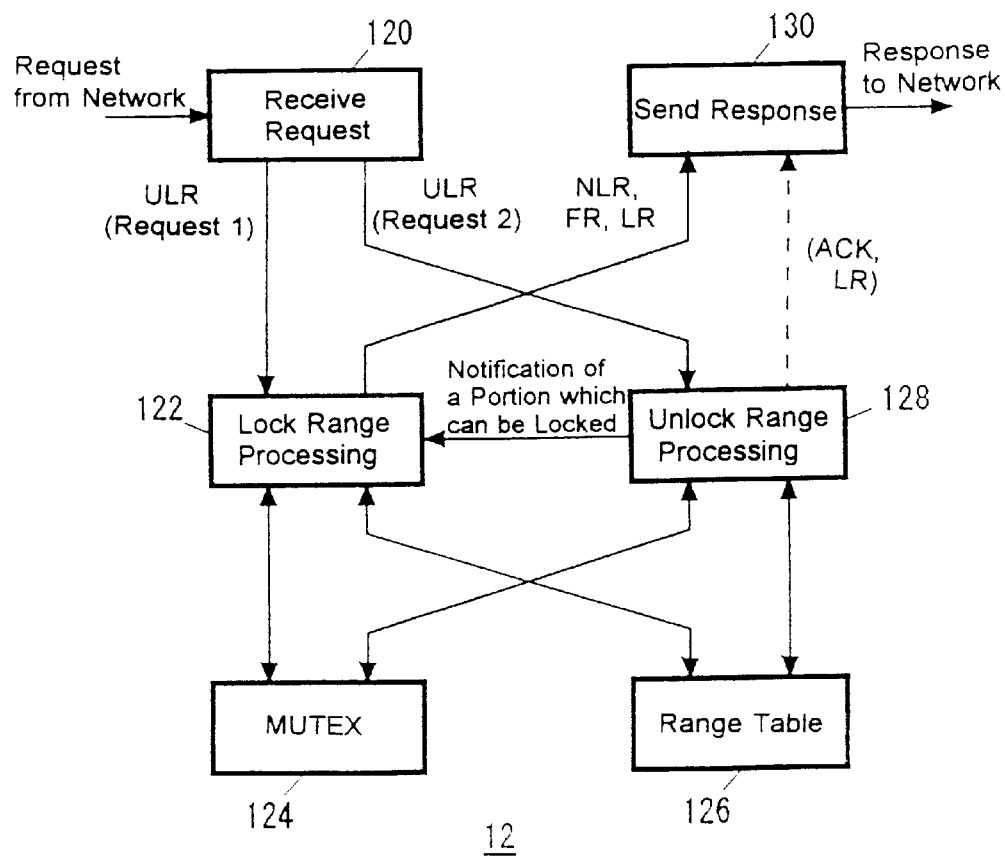
FIG. 2 is a diagram showing a configuration of the semaphore control part as shown in FIG. 1.

FIG. 2 shows a configuration of the semaphore control part 12 as shown in FIG. 1.

As shown in FIG. 2, the semaphore control part 12 comprises a request receiving part 120, a lock range processing part 122, a MUTEX 124, a range table control part 126, an unlock range processing part 128 and a response sending part 130.

With these components, the semaphore control part 12 locks each portion of the VRAM 14 by, for example, the MUTEX, so that no starvation is generated by taking into consideration the overlapped areas of the VRAM 14 in response to the request from each of the processor units 10 and returns a response to each processor unit 10 to permit it to gain an exclusive access to the locked portion according to a condition which is coordinated with the MUTEX.

The semaphore control part 12 also unlocks each locked portion of the VRAM in response to the request from each processor unit 10.

In other words, the VRAM 14 performs a synchronous control (exclusive control) by inhibiting the processor unit 10 from gaining an access to a portion of the VRAM 14 which has an area overlapping one or more of another portion when an access is permitted to any of such another portion while permitting the processor unit 10 to gain an access only when an access is not permitted to any of such another portion.

Incidentally, the MUTEX which the VRAM 14 uses and the condition to coordinate the MUTEX satisfy the standard of POSIX (portable operating system interface environment; an international standard of UNIX enacted by IEEE) thread. Table 2a: Standard Satisfied by the MUTEX of the Semaphore Control Part 12

A MUTEX may be locked or unlocked.

The operation to lock and unlock a MUTEX has a singularity and is not interrupted by another thread during operation.

A MUTEX, once locked, may be unlocked only by the thread which performed locking and can not be unlocked by other thread.

When a MUTEX is locked by a thread, another thread attempting to lock the same MUTEX is caused to wait until that MUTEX is unlocked without proceeding to execution.

Table 2b: Standard to be Satisfied by a Condition Coordinating a MUTEX of the Semaphore Control Part 12

A condition may be "waited" and "broadcasted".

Operation of "wait" and "broadcast" of the condition has a singularity and is not interrupted by another thread during operation.

A paired MUTEX inevitably exists in the condition.

In order to "wait" in a given condition, the thread which assumes to be "wait" must have locked the MUTEX which is paired with the condition and unlocked immediately before "broadcast" is executed.

When "wait" is executed in a given condition, the paired MUTEX is automatically unlocked immediately before "waiting" with that condition. This operation is performed as a part of "wait" operation for the condition thereby assuring the singularity of the operation.

When "wait" is executed in a given condition, the thread which executed "wait" does not proceed ahead (enter a waiting state) until "broadcast" operation is performed for that condition.

In order to execute "broadcast" for a given condition, the broadcasting thread must have successfully unlocked the MUTEX which is paired with the condition.

When "broadcast" is effected for a given condition, all threads waiting in that condition are released from the waiting state.

When a thread waiting for a given condition is released from the waiting state by a "broadcast" for that condition, it attempts to lock the MUTEX paired with the condition. If another thread has locked by some reason, the thread waits until the lock is released in the manner described above for the MUTEX.

The components of the semaphore control part 12 will now be described hereunder.

The request receiving part 120 analyzes the content of request data which is inputted from a processor unit 10 via a network 20 and outputs the request data to the lock range processing part 122 or the unlock range processing part 128 depending on the result of the analysis.

In other words, when a lock request (Request 1) requesting to lock the portion x of the VRAM 14 is inputted as request data from the processor unit 10, the request receiving part 120 outputs the inputted lock request to the lock range processing part 122.

Similarly, when a lock release request (Request 2) requesting to unlock the portion x of the VRAM 14 is inputted as request data from the processor unit 10, the request receiving part 120 outputs the lock release request to the unlock range processing part 128.

The range table control part 126 controls a range table which contains data used for lock and unlock processing of each portion of the VRAM 14 under the control of the lock range processing part 122 and the unlock range processing part 128. In other words, the range table control part 126 sets data indicating a first flag (Use), a second flag (Lock), range data indicating the range of the portion x and an identifier of the processor unit 10 (PU ID) which gains an access to the portion x. The range table control part 126 further generates an identifier (RID) unique to the portion x for setting in the range table and also searches the range table for retrieval.

The content of the range table will be further described with reference to FIG. 3.

Figure 3:
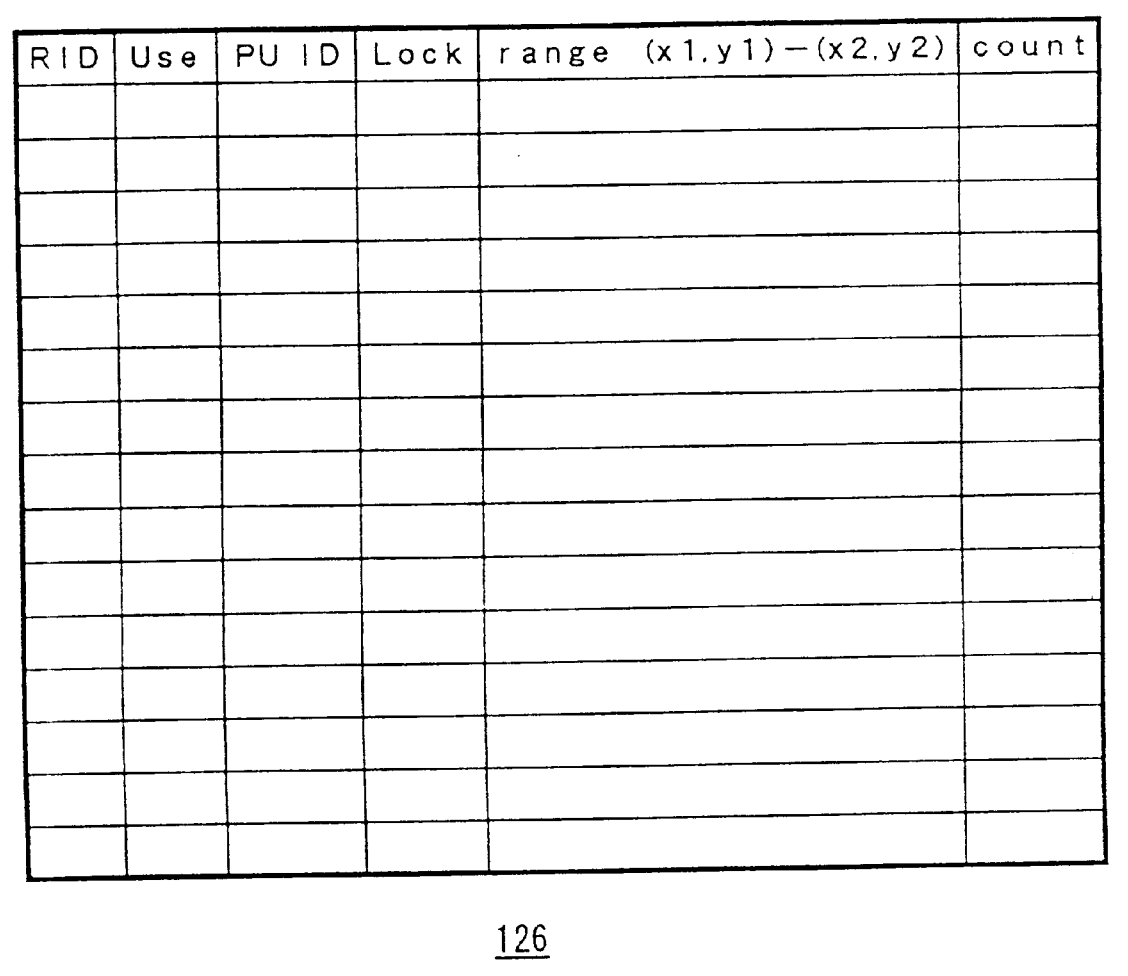

FIG. 3 shows the content of the range table which is controlled by the range table control part 126 as shown in FIG. 2.

As shown in FIG. 3, the identifier of the portion x (RID), the first flag (Use), the identifier of the processor unit 10 (PU ID), the second flag (Lock), data indicating the range of the portion x (range data) and a count of a pass through counter are stored in the range table which is controlled by the range table control part 126.

In the range table, the identifier of the portion x (RID) is an identifier which the range table control part 126 assigns uniquely to each portion x of the VRAM 14 and is used to identify the portion x of the VRAM 14 in the lock/unlock processing performed by the lock range processing part 122 and the unlock range processing part 128. Preferably, the range table control part 126 so assigns the identifier (RID) that the sequence in which an exclusive access is requested is identifiable in order to make it convenient to select the portion which can be newly locked as a result of the unlock processing.

The first flag (Use) indicates which of the processing unit 10 requests an exclusive access to the corresponding portion x. In other words, the first flag is, for example, set to a value 1 when the lock range processing part 122 receives a lock request to the portion x from either one of the processor units 10 while it is set to a value 0 when the lock range processing part 122 permits the processor unit 10 requesting a lock to gain an exclusive access and locks the portion x.

The identifier of the processor unit 10 (PU ID) is an identifier of the processor unit 10 which gains an exclusive access to the corresponding portion x and is used to identify the processor unit 10 in processing in the lock range processing part 122 and the unlock range processing part 128.

The second flag (Lock) indicates whether or not the corresponding portion x has been locked. In other words, the second flag is set to a value 1 when the lock range processing part 122 permits either one of the processor units 10 to gain an exclusive access and locks the corresponding portion x while it is set to a value 0 when the unlock range processing part 128 unlocks the corresponding portion x in response to an unlock request from either one of the processing units The range data [range (x1, y1)–(x2,y2)] indicates the range of each of a plurality of portions x in the screen of the monitor 18 and, when the portion x has a portion overlapping another portion, the range data of the portion x indicates a range including a portion overlapping the range data of another portion. FIG. 3 shows an exemplary case where the portion x is defined as a rectangular area in the screen of the monitor 18 and the range data [range (x1,y1)–(x2,y2)] indicates the orthogonal coordinates of the rectangular area.

Further, the range data is preset in the range table, for example, upon starting rasterize processing by a user of the multi-processor computer 1 or set when the processor unit 10 transmits a lock request containing range data to the lock range processing part 122 during rasterize processing. Unless specifically mentioned, a case where the range data is set by a lock request is described hereunder.

The pass through counter (count) indicates the number of locks of another portion having an area overlapping the portion x when an exclusive access is permitted to another portion having an area overlapping the portion x for each time an exclusive access is requested from the processor unit to the portion x.

This will be further explained with a particular example. When 3 portions (portions A, B and C) are so disposed that there is no overlap between the portions A and B while there is an overlapping portion between the portions A and C, and B and C as described in the above table 1, the pass through counter of the portion C is set with a value (m–p) which is a preset value m subtracted by the number p of times the portions A,B are locked by the lock range processing part 122 during the time when a lock request is issued from either one of the processor units 10 to the portion C, and set with the value m at the point of time when the portion C is locked.

In other words, the value of the pass through counter of the portion C indicates the number of times the lock requests to the portions A,B are accepted by the lock range processing part 122 passing the lock requests issued to the portion C as a value which is counted down from the value m, provided that the count value of the pass through counter may be either counted up or counted down so long as it represents the number of times the lock requests to the portions A,B are accepted by the lock range processing part 122 passing the lock request issued to the portion C.

The MUTEX 124 performs an exclusive control of permitting either one of the lock range control part 122 and the MUTEX 124 to gain an access to the range table control part 126 for preventing the lock range processing part 122 and the MUTEX 124 from simultaneously gaining an inappropriate access to the range table of the range table control part 126 and destructing the content of the range table or making it inconsistent.

When a lock request (including a notification from the unlock range processing part to be described later of a portion which may be locked) is inputted from either one of the processing unit 10 through the request receiving part 120, the lock range processing part 122 searches the range table of the range table control part 126 according to the exclusive control by the MUTEX 124, permits or rejects the exclusive access by the processor unit 10 to the portion x based on data obtained as a result of the search and outputs response data containing the identifier (PU ID) of the processing unit 10 which issued the lock request to the response sending part 130.

The details of processing in the lock range processing part 122 will now be described in detail, The lock range processing part 122 determines, based on the range data of the portion x and other portions and the second flag (Lock), whether or not there is an overlapped area in these portions and whether or not a portion having an overlapped area is locked and, when it is determined that an exclusive access to the portion x can be permitted, returns a lock completion response (LR) containing the identifier (RID) which the range table control part 126 assigned to the portion x to the processor unit 10 which requested the exclusive access and locks the portion x.

The case where an exclusive access to the portion x can be permitted includes; a case where there is no other portion which has an area overlapping the portion x, a case where a portion having an area overlapping the portion x is not locked, and a case where another portion having an area overlapping the portion x is unlocked so that the portion x becomes capable of being locked.

In locking the portion x, the lock range processing part 122 controls the range table control part 126 to cause the first flag (Use) to be set to a value and the second flag (Lock) to be set to a value 1 and cause the identifier of the processor unit 10 which permitted the exclusive access to be set in the identifier (PU ID).

The lock range processing part 122 returns a lock unable response (FR) to the processor unit 10 which requested an exclusive access in a case when a new lock request is can not be accepted, including a case where more than a predetermined number of portions of the VRAM 14 have been locked and a case where more than a predetermined number of lock requests have been in a queue without being processed.

Though the lock range processing part 122 determined that an exclusive access to the portion x could not be permitted based on the presence or absence of an area overlapping between the portion x and another portion and whether or not a portion having an overlapped area has been locked, the lock range processing part 122 returns a lock not completed response (NLR) to the processor unit 10 requesting the exclusive access and adds the lock request to the queue when a lock request could be accepted, that is when a new lock request was acceptable and a portion having an area overlapping the portion x is locked.

When a lock not completed response (NLR) portion x is returned, the lock range processing part 122 controls the range table control part 126 to cause the first flag (Use) to be set to a value 1 and the identifier of the processing unit 10 which issued a lock request to be set in the identifier (PU ID) of the processing unit 10.

The lock range processing part 122 also prevents a starvation of each portion of the VRAM 14 from occurring based on the count of the pass through counter of the range table. In other words, the lock range processing part 122 controls the range table control part 126 to cause the pass through counter to be counted down each time a lock not completed response is returned in response to a lock request to the portion x from the processor unit 10 during the time when an exclusive access to the portion x can not be permitted (locking the portion x), that is, when the first flag (Use) of the portion x is set to 1, inhibits permission of an exclusive access to a portion having an area overlapping the portion x when the count of the pass through counter reaches a value 0, and permits an exclusive access to the portion x (lock the portion x) as soon as the exclusive access to another portion is completed (another portion unlocked).

A particular example will be further explained. When 3 portions (portions A,B and C) are so disposed that there is no overlapping area between the portions A, B while there is an overlapped portion between A, B and C as described with reference to Table 1, the lock range processing part 122 causes the pass through counter of the portion C to be counted down each time the portions A, B are locked during the time when a lock request is issued to the portion C (the first flag (Use) of the portion C is a value 1).

The lock range processing part 122 rejects a new request of exclusive access to the portions A, B when the count of the pass through counter (count) reaches a value 0. The lock range processing part 122 further permits an exclusive access to the portion C and locks the portion C at the point of time when the exclusive access to the portions A, B are completed (the portions A, B are unlocked). Occurrence of starvation in the portion C can be thus prevented by limiting the number of times the permissions of exclusive access to the portions A, B exceeds permissions of exclusive access to the portion C.

The unlock range processing part 128, when receiving a lock release request to the portion x which is inputted from either one of processor nits 10 via the request receiving part 120, controls the range table control part 126 according to the exclusive control by the MUTEX 124 to cause it to search the range table using the identifier (PU ID) of the processor unit 10 involved in the inputted lock release request and the first flag (Use) and the second flag (Lock) of the portion x to be set to a value 0 to unlock the portion x.

When unlocking the portion x produces a new portion which can be locked, the unlock range processing part 128 also notifies the lock range processing part 122 of the new portion which can be locked for locking the new portion.

While the unlock range processing part 128 does not specifically return a response to the lock release request from the processor unit 10, the unlock range processing part 128 may alternatively outputs ACK to be returned to the processor unit 10 to the response sending part 130.

The response sending part 130 outputs response data (and ACK), etc., which is inputted from the lock range processing part 122 (and the unlock range processing part 128) to the processor unit 10 via the network 20.

Figure 4:
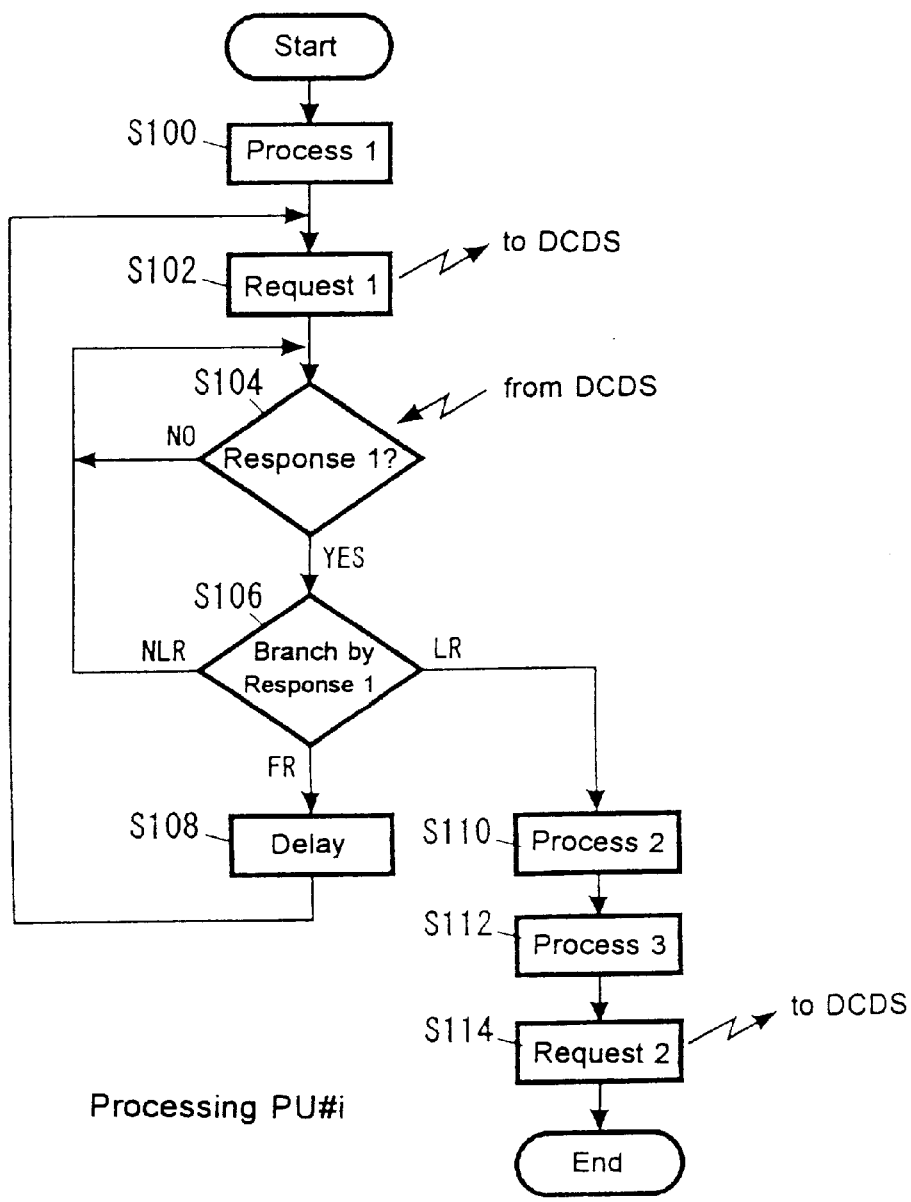
FIG. 4 is a flow chart showing the operation of the processor unit shown in FIG. 1.
Figure 5:
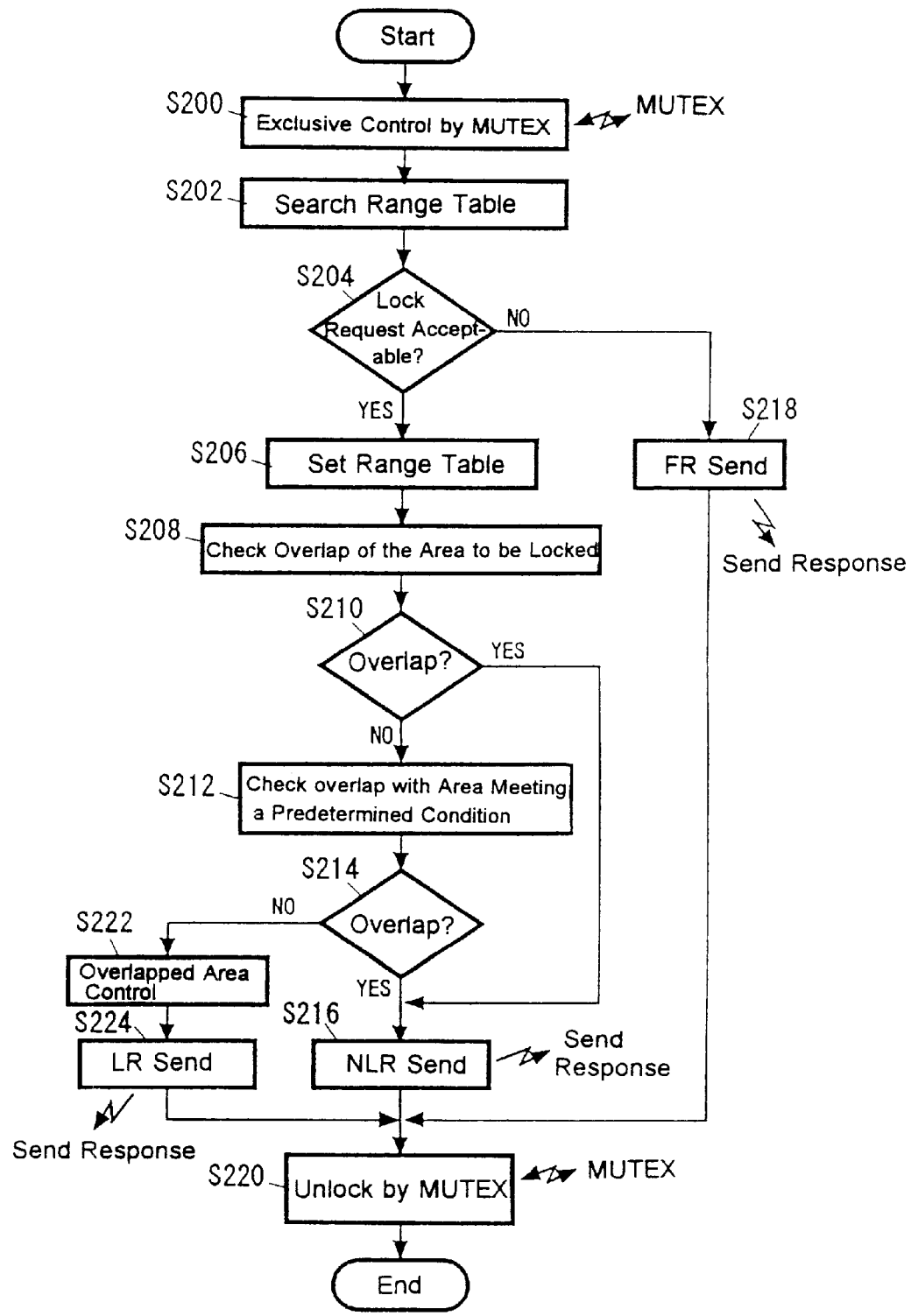
FIG. 5 is a flow chart showing the operation of the lock range processing part of the semaphore control part as shown in FIG. 1 and FIG. 2.
Figure 6:
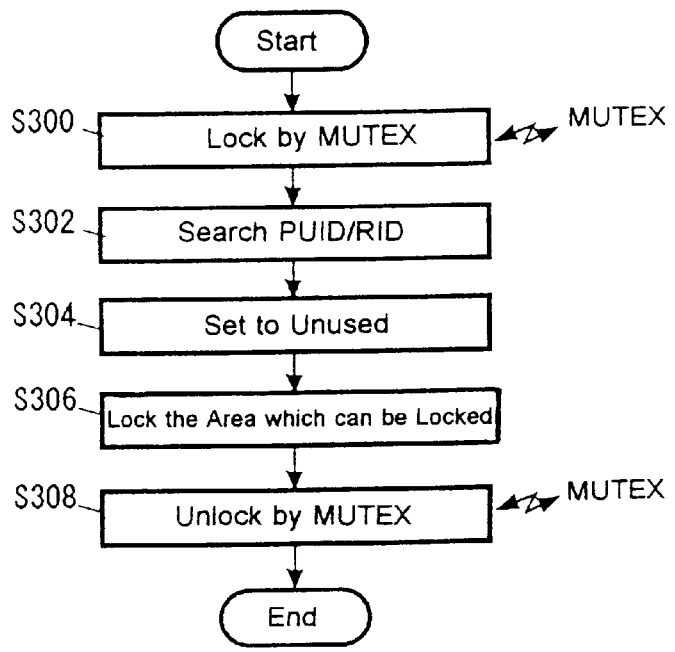
FIG. 6 is a flow chart showing the operation of the unlock range processing part of the semaphore control part as shown in FIG. 1 and FIG. 2.

The operation of the multi-processor computer 1 is now described hereunder with reference to FIG. 4 to FIG. 6. For the sake of simplicity, only the normal operation of the multi-processor computer 1 will be described hereunder with abnormal operation of the multi-processor computer 1 omitted and the operation of the request receiving part 120 and the response sending part 130 is also omitted as appropriate.

The operation of the processor unit 10 is now described with reference to FIG. 4.

FIG. 4 is a flow chart showing the operation of the processor unit 10 as shown in FIG. 1.

As shown in FIG. 4, the processor unit 10 executes a process/thread of generating k (k=2 in this embodiment) dimensional image data to be written into the VRAM 14 in step 100 (S100) and further performs processing 1 for obtaining the portion x of the VRAM 14 which includes the image data.

In step 102 (S102), the processor unit 10 outputs a lock request (Request 1; LRR) requesting an exclusive access to the portion x to the semaphore control part 12 along with range data of the portion x and the identifier (PU ID) of the processor unit 10.

In step 104 (S104), the processor unit 10 determines whether or not response data (Response 1; either one of NLR, FR, LR) is returned from the semaphore control part 12 and proceeds to the process of the step 106 if the response is returned.

In step 106 (S106), the processor unit 10 analyzes the content of the response data (Response 1) and returns to the process of S 104 if the response data is lock not completed response (NLR), proceeds to the process of S108 if the response data is lock unable response (FR) and proceeds to the process of S110 if the response data is lock completed response (LR).

In step 108 (S108), the processor unit 10 waits for a predetermined length of time, e.g., until a random time length elapses each time a lock unable response (FR) is received and returns to the process of S102.

In step 110 (S110), the processor unit 10 performs a process 2 of correlating the identifier (RID) of the portion x contained in the lock completed response (LR) with the range data of the portion x.

In step 112 (S112), the processor unit 10 performs a rasterize process 3 of writing the image data (graphic primitive) generated in the process of S100 into the portion x of the VRAM 14.

In step 114 (S114), the processor unit 10 outputs a lock release request (ULR) requesting to unlock the portion x to the semaphore control part 12 along with the identifier (PU ID) of that processor unit and the identifier (RID) of the portion x and ends the process.

The operation of the lock range processing part 122 is now described with further reference to FIG. 5.

FIG. 5 is a flow chart showing the operation of the lock range processing part 122 of the semaphore control part 12 as shown in FIG. 1 and FIG. 2.

As shown in FIG. 5, in step 200 (S200), the lock range processing part 122 receives a lock request (Request 1) which the processor unit 10 outputted in the process of S102 as shown in FIG. 4 via the request receiving part 120 and requests the MUTEX to gain an exclusive access to the range table control part 126.

In step 202 (S202), when an exclusive access to the range table (FIG. 3) of the range table control part 126 is permitted by the MUTEX 124, the lock range processing part 122 searches the range table and counts the number of first flags (Use) and second flags (Lock) which are set to a value 1.

In step 204 (S204), it is determined whether or not the number of the first flags (Use) and the number of the second flags (Lock) are both no greater than a predetermined number, that is, whether or not a new lock request may be accepted and the step 204 proceeds to the process of S206 if it is acceptable while proceeding to the process of S218 if it is not acceptable.

In step 206 (S206), the lock range processing part 122 controls the range table control part 126 to cause the identifier (RID) of the portion x which the range table control part 126 generated, the range data of the portion x and the identifier (PU ID) of the processor unit 10 to be set in the range table and further the first flag (Use) to be set to a value 1, the second flag (Lock) to be set to a value 0 and the value of the pass through counter (count) to a value m.

In step 208 (S208), the lock range processing part 122 checks an overlapped area between the portion x and other portions based on the range data of the portion x and the other portions.

In step 210 (S210), the lock range processing part 122 determines whether or not there is an overlapped area between the portion x and other portions and proceeds to S212 when there is an overlapped area while proceeding to S216 when there is no overlapped area.

In step 212 (S212), the lock range processing part 122 controls the range table control part 126 to have it search the range table to check for a portion within other portions having an area overlapping the portion x in which the first flag (Use) is value 1, the second flag (Lock) is value 0 and the count of the pass through counter (count) is value 0. In other words, the lock range processing part 122 searches for a portion which has not been locked while an exclusive access is requested and for which exclusive accesses have been permitted m times to other portion having an area overlapping that portion.

In step 214 (S214), the lock range processing part 122 determines whether or not there is a portion in which the first flag (Use) is value 1, the second flag (Lock) is value 0 and the count of the pass though counter (count) is value 0 and proceeds to S216 when there is such portion while proceeding to S222 when there is no such portion.

This is further explained with reference to a specific example. When the processor unit 10 specifies the portion A of the VRAM 14 described in the above with reference to Table 1 as the portion x upon lock request, the lock range processing part 122 checks the first flag (Use), the second flag (Lock) and the count value of the pass through counter (count) and proceeds to S216 when these values are 1, 0, 0 while proceeding to S222 otherwise.

In step 216 (S216), the lock range processing part 122 returns a lock not completed response (NLR) to the processor unit 10 which requested an exclusive access to the portion x.

In step 218 (S218), the lock range processing part 122 returns a lock unable response (FR) to the processor unit 10 which requested an exclusive access to the portion x.

In step 220 (S220), the lock range processing part 122 notifies the MUTEX 124 of completion of processing and the MUTEX 124 invalidates (unlocks) permission of exclusive access to the range table control part 126 by the lock range processing part 122.

In step 222 (S222), the lock range processing part 122 performs a control to the overlapped area. In other words, the lock range processing part 122 controls the range table control part 126 to cause all pass through counters (count) of other portions having an area overlapping the portion x in which the first flag (Use) of the portion C is value 1 and the second flag (Lock) of the portion C is value 0 to be decremented.

In step 224 (S224), the lock range processing part 122 returns a lock completion response (LR) to the processor unit 10 which requested an exclusive access to the portion x and fur(Lock) of the second flag (Lock) of the portion x to a value 1 for locking the portion x.

The operation of the unlock range processing part 128 will now be described hereunder with reference to FIG.

FIG. 6 is a flow chart showing the operation on the unlock range processing part 128 of the semaphore control part 12 as shown in FIG. 1 and FIG. 2.

As shown in FIG. 6, in step 300 (S300), when the unlock range processing part 128 receives a lock release request to the portion x from the processor unit 10, it requests the MUTEX 124 for an exclusive access to the range table control part 126.

In step 302 (S302), when an exclusive access to the range table control part 126 is permitted by the MUTEX 124, the unlock range processing part 128 controls the range table control part 126 to cause it to search the range table by using the identifier (PU ID) of the processor unit 10 of the portion x which is contained in the lock release request and the identifier (RID) of the portion for data of the portion x.

In step 304 (S304), the unlock range processing part 128 controls the range table control part 126 to cause it to set the first flag (Use) and the second flag (Lock) of the portion x to a value 0 for unlocking the portion x.

In step 306 (S306), the unlock range processing part 128 controls the range table control part 126 to cause it to search the range table and select a portion which can now be locked as a result of unlocking the portion x based on the result of the search. The unlock range processing part 128 further notifies the lock range processing part 122 of the selected portion as a portion which can be locked along with data which is necessary for processing in the lock range processing part 122, such as the identifier (PU ID) of the processor unit 10 of that portion. The lock range processing part 122 processes this notification as shown in FIG. 5 in the manner similar to the lock request from the processor unit 10 for locking the portion which can be locked. Incidentally, processing the condition shown in the Table 2b is performed by the response sending part 130 in the process of S306.

Incidentally, the unlock range processing part 128 selects the portion to be notified to the lock range processing part 122 which can be locked with older exclusive access request first in sequence, for example.

The portion A, B and C of the VRAM described above in the Table 1 (there is no overlap between the portions A and B while the portion A and B respectively overlap the portion C) will now be further described as an example.

When the portion x (portion A, for example) is unlocked, the unlock range processing part 128 first looks for a portion in other portions (portions B, C) which is locked while it does not select a portion (portion C) overlapping the portion (portion B, for example) which is locked as a portion which can be locked and does not give notification to the lock range processing part 122.

The unlock range processing part 128 then looks for a portion to which an exclusive access has been requested but has not been locked (portion C, for example) starting from older exclusive access requests in sequence and selects this portion (portion C) as a portion which can be locked when there in no other portion having an area overlapping the portion found and notifies the lock range processing part 122 of this.

When there is other portion having an area overlapping the portion (portion C) found, the unlock range processing part 128 determines whether or not the count of the pass through counter (count) of the range 1 table of other portions is 0. If there is at least one portion in which the count of the pass through counter (count) is 0 (when the count of the pass through counter of the portion B is o, for example), the unlock range processing part 128 does not select the portion found (portion C) as a portion which can be locked and does not give notification to the lock range processing part 122. Conversely, when there is no portion in which the count of the pass through counter (count) is 0, the unlock range processing part 128 selects the portion found (portion C) as a portion which can be locked and gives notification to the lock range processing part 122.

In step 308 (S308), the unlock range processing part 128 notifies the MUTEX 124 of the completion of processing and the MUTEX 124 invalidates (unlocks) permission of an exclusive access to the range table control part 126 by the unlock range processing part 128.

The effect of the computer resource access control method (exclusive access control) of this invention is now described hereunder.

FIG. 7(A) and (B) show an erroneous image and a correct image obtained in a rasterize processing in which a plurality of processor units 10 gain an access to the VRAM 14 in parallel.

Figure 7:
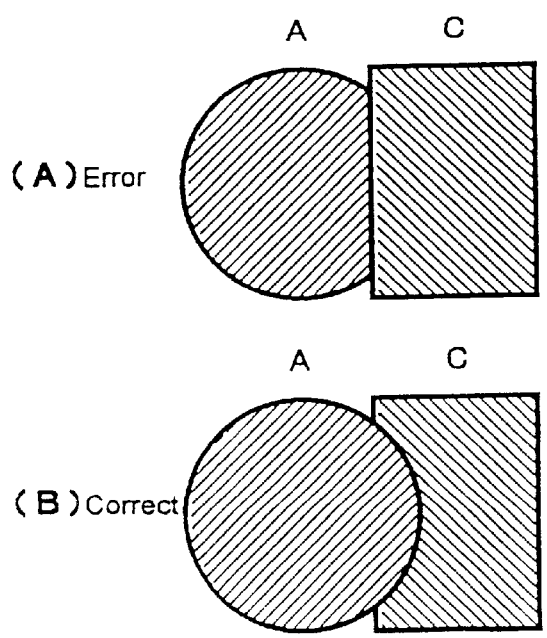
FIG. 7(A), (B) are views illustrating an erroneous image and a correct image obtained when a plurality of processor units gain parallel accesses to the VRAM 14 for rasterize processing, respectively.
Figure 8:
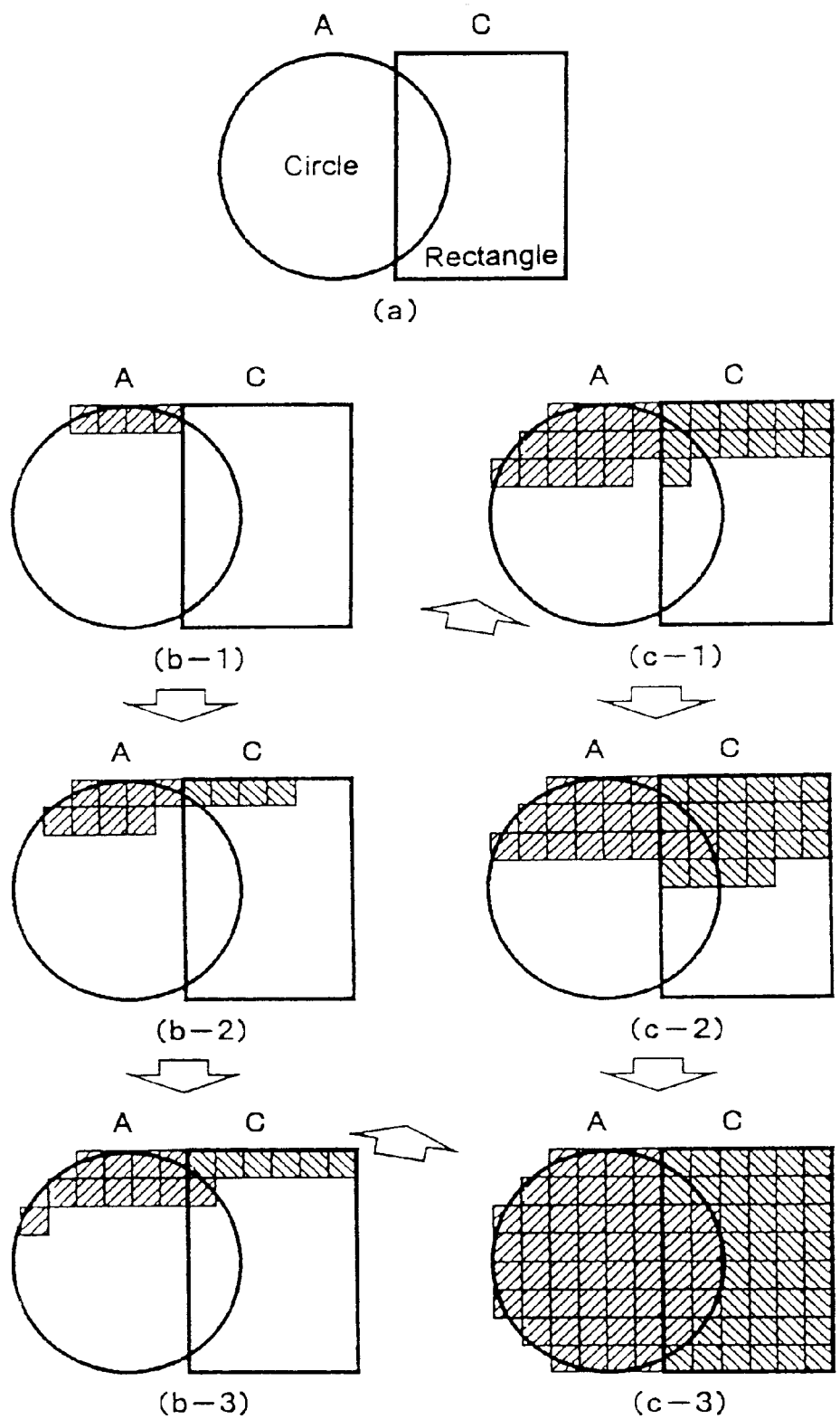
FIG. 8 are views illustrating an inexpedience generated when the MUTEX effects an exclusive access control for each picture element to generate the image shown in FIG. 7(B) without using the computer resource access control method of the present invention.

FIG. 8 illustrates an example of inexpedience resulted when the image shown in FIG. 7 is generated by controlling an exclusive access by the MUTEX for each picture element without using the computer resource access control method of this invention.

As described in the above, when it is attempted to generate a correct image of a circle A which is overlaid on a rectangle B as shown un FIG. 7(B) by a rasterize processing using two processor units 10 for example, a wrong effect in which an erroneous image of a rectangle B overlaid on a circle A is generated due to reversal of the sequence of processing as shown in FIG. 7(A) is not inherently resulted, when an exclusive access control to each portion of the VRAM 14 in the multi-processor computer 1 is effected. Further, a starvation in each portion of the VRAM 14 is prevented from occurring.

Further, when it is attempted to draw the circle A first in the image shown in FIG. 7(B) by using two processor units 10 by effecting a control of exclusive access by the MUTEX for each picture element without effecting an exclusive access control to each portion of the VRAM 14 in the multi-processor computer as shown in FIGS. 8(b-1) , . . . (c-2), a pass through takes place because it takes more time to obtain the area of the circle A than the area of the rectangle B so that picture elements of the rectangle B may be drawn first in the picture elements within the area of the circle A [FIG. 8(a)] before a picture element of the circle A is drawn. When such inexpedience is resulted, an image will be eventually generated which is neither the circle A overlaid on the rectangle B nor the rectangle B overlaid on the circle A as shown in FIG. 8 (c-3).

In the multi-processor computer 1, an exclusive access control is effected as a unit for the portion including the circle A and the portion including the rectangle B, such inexpedience due to passing through of the sequence of drawing the picture element unit can not take place so that the amount of processing as well as the memory consumption are less than the case where the exclusive access control is effected for each picture element thereby providing an improved efficiency of the rasterize processing as well as a high speed operation.

While a case where the exclusive access control is effected to the portion (area) of the VRAM 14 was described in the embodiment in the above, the exclusive access control of this invention may be applied to the exclusive access control to other computer resources including a writable recording medium such as a hard disk, etc.

Also, while it was described that the processor unit 10 and the semaphore control part 12 were implemented in an independent hardware, they may be a software which is executed in parallel on a same hardware, for example.

Further, while the exclusive access control of this invention was described by taking an example in which it is applied to rasterize processing of a two dimensional image, the exclusive access control of this invention may be applied to further processing including rasterize processing of three dimensional image or two or three dimensional simulation of fluid, etc.

Further, the operation of the processor unit 10 and unlock processing part 128 may be so modified that release of the portion x may be requested along with a lock release request upon the ending processing and, in response to a lock release request including such request, the portion x is removed form the range table.

Further, instead the lock control processing part 122 performs processing to lock the portion which becomes capable of being locked by an unlock processing in response to a notification from the unlock control processing part 128, the operation may be so modified that the unlock control processing part 128 itself performs the processing and returns a response (LR,etc.) to the processor unit 10.

It is also possible to apply modifications to the multi-processor computer 1 of this invention, including connecting the processor unit 10 and the semaphore control part 12 via a bus in place of the network 20 in the multi-processor computer 1.

As described in the above, according to the computer resource access control apparatus and method of this invention, an exclusive access can be controlled so as to obtain a correct process result without generation of a starvation when a plurality of process/threads gain an access to computer resources such as a shared VRAM for rasterize processing in a synchronous computer system.

In addition, a high processing performance can be obtained with use of a memory of appropriate capacity according to the computer resource access control method of the present invention.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A computer resource access control apparatus which, when one of a plurality of processing means requests an access to a plurality of portions comprising divisions of the computer resource which are divided such that at least a part of areas may overlap each other while inhibiting an access by other processing means (exclusive access), permits or inhibits said exclusive access to said portions, comprising;

exclusive access permission control means, operative when said processing means requests an exclusive access to said portion while an exclusive access to other one or more of said portions having an area overlapping said portion to which said processing means requested an exclusive access is not permitted, for permitting said processing means requesting the exclusive access to gain an exclusive access to said portion, a plurality of counting means provided in correspondence to each of said portions for counting the number of said exclusive accesses permitted to said other one or more portions having an area overlapping the corresponding one of said portions for each period in which said exclusive access to corresponding one of said portions is requested while said exclusive access to the corresponding one of said portions is not permitted, and access inhibiting control means for inhibiting permission of an exclusive access to said other one or more portions having an area overlapping said portion corresponding to said counting means when the count of said counting means reaches a predetermined value.

2. A computer resource access control apparatus of claim 1 in which said plurality of processing means gain an exclusive accesses to said portion when an exclusive access is permitted while they wait a permission of exclusive access to said portion when the exclusive access is inhibited.

3. A computer resource access control apparatus of claim 2 in which, said access permission control means comprises;

permission list preparing means for preparing a permission list which indicates said portions to which an exclusive access has been permitted, waiting list preparing means for preparing a waiting list indicating said portions to which said processing means wait to gain an exclusive access, and exclusive access permission means for permitting an exclusive access to the portions(s) other than said portion(s) indicated by said permission list, said portion (s) having an area overlapping said portion(s) indicated by said permission list, and said portion(s) indicated by said waiting list among said portions to which an exclusive access is requested.

4. A computer resource access control apparatus of claim 3 in which said plurality of processing means notify completion of an exclusive access when the exclusive access to said portion(s) is completed while said permission list preparing means adds to said permission list said portion(s) to which the exclusive access was permitted and removes said portion (s) which was notified of completion of exclusive access from said permission list.

5. A computer resource access control apparatus of claim 3 in which said waiting list preparing means adds to said waiting list said portion(s) indicated by said permission list, said portion(s) having an area overlapping said portion(s) indicated by said permission list, and said portion(s) to which an exclusive access was inhibited among said portions to which an exclusive access was requested while removing from said waiting list said portion(s) corresponding to said counting means the count of which reaches said predetermined value.

6. A computer resource access control method in which, when one of a plurality of processing means requests an access to a plurality of portions comprising divisions of the computer resource which are divided such that at least a part of areas may overlap each other while inhibiting another processing means from gaining an access (exclusive access), permits or inhibits each of said processing means to gain said exclusive access to said portions, comprising;

permitting said processing means requesting the exclusive access to gain an exclusive access to said portion when said processing means requests an exclusive access to said portion while an exclusive access to other one or more of said portions having an area overlapping said portion to which said processing means requested an exclusive access is not permitted, counting the number of said exclusive accesses permitted to said other one or more portions having an area overlapping corresponding one of said portions for each period in which said exclusive access to corresponding one of said portions is requested and said exclusive access to the corresponding one of said portions is not permitted and, inhibiting permission of an exclusive access to said other one or more portions having an area overlapping said portion in which said count reaches a predetermined value.

7. A computer readable recording medium recording therein a program which, when one of a plurality of processing means requests an access to a plurality of portions comprising divisions of the computer resource which are divided such that at least a part of areas may overlap each other while inhibiting another processing means from gaining an access (exclusive access), permits or inhibits each of said processing means to agin said exclusive access to said portions, and causes a computer to execute the steps of;

permitting said processing means requesting the exclusive access to gain an exclusive access to said portion when said processing means requests an exclusive access to said portion while an exclusive access to other one or more of said portions having an area overlapping said portion to which said processing means requested an exclusive access is not permitted, counting the number of said exclusive accesses permitted to said other one or more portions having an area overlapping corresponding one of said portions for each period in which said exclusive access to corresponding one of said portions is requested and said exclusive access to the corresponding one of said portions is not permitted, and inhibiting permission of an exclusive access to said other one or more portions having an area overlapping said portion in which said count reaches a predetermined value.

* * * * *

UNITED STATES PATENT AND TRADEMARK OFFICE
CERTIFICATE OF CORRECTION

PATENT NO. : 6,101,569
DATED : August 8, 2000
INVENTOR(S) : Kohtaroh Miyamoto, et al.

It is certified that error appears in the above-identified patent and that said Letters Patent are hereby corrected as shown below:

Column 7, Line 2: "value, one" should read --value. One--

Column 7, Line 25: "A computer readable..." should begin new paragraph.

Column 13, Line 36: "nits" should read --unit--

Column 15, Line 61: "fur(LOCK) of the second flag" should read

--further sets the second flag--

Column 16, Line 58: "range 1 table" should read --range table--

Column 19, Line 18: "portions(s)" should read --portion(s)--

Column 20, Line 28: "agin" should read --again--

Signed and Sealed this

Twenty-fourth Day of April, 2001

Attest:

NICHOLAS P. GODICI

Attesting Officer     Acting Director of the United States Patent and Trademark Office